United States Patent
Wysong et al.

(10) Patent No.: US 12,509,566 B2
(45) Date of Patent: Dec. 30, 2025

(54) NUCLEATING AGENTS FOR PIR FOAMS

(71) Applicant: THE CHEMOURS COMPANY FC, LLC, Wilmington, DE (US)

(72) Inventors: Ernest Byron Wysong, Chadds Ford, PA (US); Harrison K. Musyimi, Bear, DE (US); James M. Tocyloski, Newark, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 731 days.

(21) Appl. No.: 17/796,524

(22) PCT Filed: Feb. 3, 2021

(86) PCT No.: PCT/US2021/016394
§ 371 (c)(1),
(2) Date: Jul. 29, 2022

(87) PCT Pub. No.: WO2021/158649
PCT Pub. Date: Aug. 12, 2021

(65) Prior Publication Data
US 2023/0348685 A1 Nov. 2, 2023

Related U.S. Application Data

(60) Provisional application No. 62/969,971, filed on Feb. 4, 2020.

(51) Int. Cl.
| | |
|---|---|
| *C08J 9/14* | (2006.01) |
| *C08G 18/08* | (2006.01) |
| *C08G 18/42* | (2006.01) |
| *C08G 18/76* | (2006.01) |
| *C08G 101/00* | (2006.01) |

(52) U.S. Cl.
CPC ............ *C08J 9/141* (2013.01); *C08G 18/14* (2013.01); *C08G 18/4202* (2013.01); *C08G 18/7692* (2013.01); *C08J 9/149* (2013.01); *C08G 2101/00* (2013.01); *C08J 2201/022* (2013.01); *C08J 2203/14* (2013.01); *C08J 2205/052* (2013.01); *C08J 2375/06* (2013.01)

(58) Field of Classification Search
CPC ............ C08G 18/2825; C08G 18/2885; C08J 2203/162; C08J 2375/04–12
See application file for complete search history.

(56) References Cited

U.S. PATENT DOCUMENTS

| | | | |
|---|---|---|---|
| 5,204,169 A | 4/1993 | York | |
| 5,205,956 A * | 4/1993 | Volkert | C08J 9/149 521/181 |
| 5,393,799 A * | 2/1995 | De Vos | C08G 18/8087 521/157 |
| 2007/0100010 A1 | 5/2007 | Creazzo | |
| 2011/0196055 A1* | 8/2011 | Kramer | C08G 18/5027 521/170 |
| 2012/0202904 A1 | 8/2012 | Chen | |
| 2016/0362531 A1 | 12/2016 | Chen | |
| 2018/0327563 A1* | 11/2018 | Klostermann | C08J 9/0095 |
| 2019/0119461 A1 | 4/2019 | Chen | |

FOREIGN PATENT DOCUMENTS

| | | | |
|---|---|---|---|
| DE | 4143148 A1 * | 7/1993 | ............. C08J 9/149 |
| EP | 520860 A1 * | 12/1992 | ............. C08J 9/127 |
| JP | 2017502141 A | 1/2017 | |
| WO | WO-9637540 A1 * | 11/1996 | ......... C08G 18/8087 |
| WO | 2011050017 A1 | 4/2011 | |
| WO | 2019/213463 A1 | 7/2019 | |

OTHER PUBLICATIONS

Machine Translation of EP520860 A1. Dec. 30, 1992. (Year: 1992).*
Machine Translation of DE4143148 A1. Jul. 1, 1993. (Year: 1993).*

* cited by examiner

*Primary Examiner* — Stephen E Rieth

(57) ABSTRACT

The present application provides foams having improved insulation and thermal performance and processes of forming said foams. Exemplary foams described herein are prepared according to a process comprising reacting a foamable composition comprising a blowing agent and one or more nucleating agents, under conditions effective to form the foam.

25 Claims, 4 Drawing Sheets

NUCLEATING AGENTS FOR PIR FOAMS

CROSS REFERENCE TO RELATED APPLICATIONS

This application is a national filing under 35 U.S. C. 371 of International Application No. PCT/US2021/016394 filed Feb. 3, 2021, and claims priority of U.S. Provisional Application No. 62/969,971 filed Feb. 4, 2020, the disclosures of which are incorporated herein by reference in its entirety.

TECHNICAL FIELD

This invention relates to foams having improved insulation and thermal performance, processes of forming said foams, and foamable compositions useful for preparing said foams. The processes described herein comprise reacting reacting a foamable composition comprising a blowing agent and one or more nucleating agents described herein, under conditions effective to form the foam.

BACKGROUND

Closed-cell polyisocyanate-based foams are widely used for insulation purposes, for example, in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are widely used for a variety of applications including insulating roofs, insulating large structures such as storage tanks, insulating appliances such as refrigerators and freezers, insulating refrigerated trucks and railcars, etc. All of these various types of polyurethane foams require blowing (expansion) agents for their manufacture. Insulating foams depend on the use of halocarbon blowing agents, not only to foam the polymer, but also for their low vapor thermal conductivity, a very important characteristic for insulation value. Historically, polyurethane foams used CFCs (chlorofluorocarbons, for example CFC-11, trichlorofluoromethane), HCFCs (hydrochlorofluorocarbons, for example HCFC-141b, 1,1-dichloro-1-fluoroethane), and HFCs (hydrofluorocarbons, for example, HFC-245fa, HFC-365mfc) as the primary blowing agents.

SUMMARY

The present application provides, inter alia, foamable compositions comprising a blowing agent and one or more nucleating agents, under conditions effective to form a foam, wherein the nucleating agent is selected from:
HFO-162-13mczy;
HFO-162-13mcyz;
(E)-1,1,1,2,2,3,5,5,6,6,7,7,7-tridecafluoro-4-methoxyhept-3-ene;
(E)-1,1,1,2,2,4,5,5,6,6,7,7,7-tridecafluoro-3-methoxyhept-3-ene;
1,1,1,2,2,3,4,5,6,6,7,7,7-tridecafluoro-5-methoxyhept-3-ene;
(Z)-1,1,1,2,2,3,4,5,6,6,7,7,7-tridecafluoro-5-methoxyhept-3-ene;
(E)-1,1,1,2,2,3,4,5,6,6,7,7,7-tridecafluoro-5-methoxyhept-3-ene;
1,1,1,2,3,4,5,5,6,6,7,7,7-tridecafluoro-4-methoxyhept-2-ene;
(Z)-1,1,1,2,3,4,5,5,6,6,7,7,7-tridecafluoro-4-methoxyhept-2-ene;
(E)-1,1,1,2,3,4,5,5,6,6,7,7,7-tridecafluoro-4-methoxyhept-2-ene;
(Z)-1,1,1,2,2,4,5,5,6,6,7,7,7-tridecafluoro-3-methoxyhept-3-ene;
(Z)-1,1,1,2,2,3,5,5,6,6,7,7,7-tridecafluoro-4-methoxyhept-3-ene;
HFC-4310mee;
HFO-153-10mzzy;
HFO-153-10mczz
FC-161-14mcyy;
3,3,4,4,5,5,6,6,6-nonafluorohex-1-ene;
3,3,4,4,5,5,6,6,7,7,8,8,8-tridecafluoro-1-octanol and
3,3,4,4,5,5,6,6,7,7,8,8,8-tridecafluorooct-1-ene;
or any mixture thereof.

The present application further provides a process of forming a foam, comprising reacting a foamable composition described herein under conditions effective to form a foam.

The present application further provides a foam (e.g., polyisocyanurate or a polyurethane) prepared from a foamable composition according to a process described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DETAILED DESCRIPTION

Figure 1:
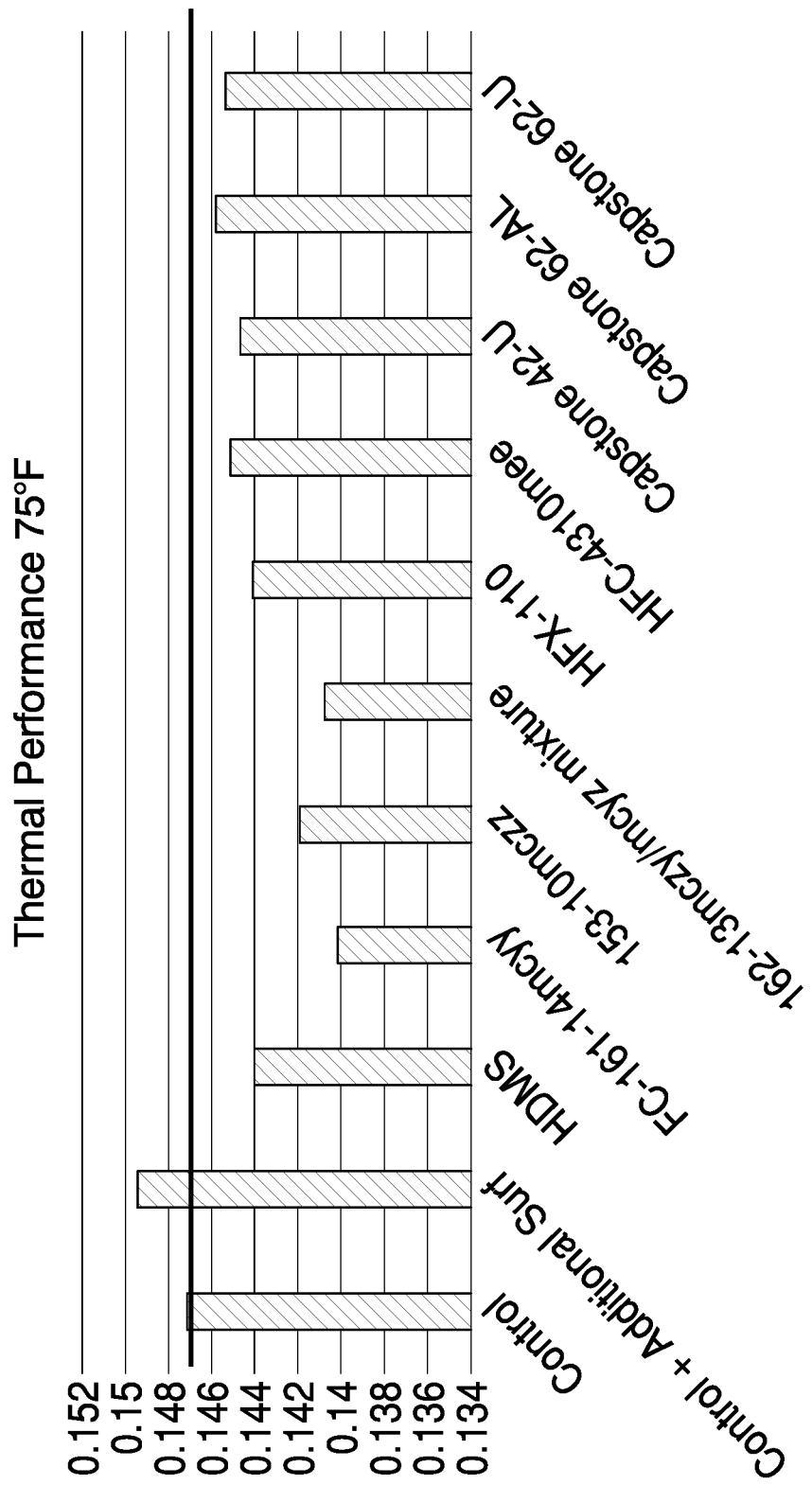
FIGS. 1-2 show a comparison of thermal performance of foams prepared in the presence and absence of nucleating agents. The solid horizontal line represents the thermal performance of a foam prepared using the Control formulation (i.e., no nucleating agent; cyclopentane blowing agent).

Polyisocyanurate (PIR) foam is a growing important market segment in the rigid insulation industry due to its excellent thermal performance and fire classification capability. The predominate blowing agents used for PIR panel foams are $C_5$ hydrocarbons, such as cyclopentane, n-pentane, isopentane, or mixtures thereof. Although these $C_5$ blowing agents can provide adequate thermal insulation performance for current requirements, increasingly stringent energy efficiency regulations are driving further improvements. Hydrofluoroolefins (HFOs) represent a class of compounds being used as blowing agents in polyurethane and related foams. Further, many HFOs react and decompose in the atmosphere relatively quickly. Thus, many HFOs have no or very low global warming potential (GWP) and do not contribute to the depletion of stratospheric ozone and global warming. HFOs have been shown to have improved insulation performance in comparison to $C_5$ hydrocarbons, but are considerably more expensive. Therefore, a need for adding a minimum amount of HFO to $C_5$ hydrocarbons to deliver a maximum improvement in insulation performance is needed.

Spray polyurethane foam (SPF) is a growing important market segment in the rigid insulation industry due to its excellent thermal performance and building envelope sealing capability. When applied, the speed and quality of the applied layers is critical for effective application and efficiency of performance parameters, including density and surface appearance. In addition, such foams are applied in situ in the buildings of interest under a variety of environmental conditions, including cold winter time temperatures. Typical physical foam expansion agents require heat to evaporate and expand. This becomes difficult in cold temperatures when the catalysis of the polyurethane polymerization is slowed, thus diminishing the only source of heat on the surface of the sprayed area. Therefore, providing a means of applying SPF with efficient lay down and under cold conditions represents a benefit for the industry.

Definitions and Abbreviations

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term "consists essentially of" or "consisting essentially of" occupies a middle ground between "comprising" and "consisting of".

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term "about" is meant to account for variations due to experimental error (e.g., plus or minus approximately 10% of the indicated value). All measurements reported herein are understood to be modified by the term "about", whether or not the term is explicitly used, unless explicitly stated otherwise.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

The following abbreviations may be used herein:

HFO-153-10mczz: (E orZ)-1,1,1,2,2,5,5,6,6,6-decafluoro-3-hexene (E)-3m-3-ene: (E)-1,1,1,2,2,4,5,5,6,6,7,7,7-tridecafluoro-3-methoxyhept-3-ene (Z)-3m-3-ene: (Z)-1,1,1,2,2,4,5,5,6,6,7,7,7-tridecafluoro-3-methoxyhept-3-ene 4m-2-ene: 1,1,1,2,3,4,5,5,6,6,7,7,7-tridecafluoro-4-methoxyhept-2-ene (mixture of isomers)

(E)-4m-2-ene: (E)-1,1,1,2,3,4,5,5,6,6,7,7,7-tridecafluoro-4-methoxyhept-2-ene (Z)-4m-2-ene: (Z)-1,1,1,2,3,4,5,5,6,6,7,7,7-tridecafluoro-4-methoxyhept-2-ene (E)-4m-3-ene: (E)-1,1,1,2,2,3,5,5,6,6,7,7,7-tridecafluoro-4-methoxyhept-3-ene (Z)-4m-3-ene: (Z)-1,1,1,2,2,3,5,5,6,6,7,7,7-tridecafluoro-4-methoxyhept-3-ene 5m-3-ene: 1,1,1,2,2,3,4,5,6,6,7,7,7-tridecafluoro-5-methoxyhept-3-ene (mixture of isomers)

(E)-5m-3-ene: (E)-1,1,1,2,2,3,4,5,6,6,7,7,7-tridecafluoro-5-methoxyhept-3-ene (Z)-5m-3-ene: (Z)-1,1,1,2,2,3,4,5,6,6,7,7,7-tridecafluoro-5-methoxyhept-3-ene;

Capstone 42U: 3,3,4,4,5,5,6,6,6-nonafluorohex-1-ene Capstone 62-AL: 3,3,4,4,5,5,6,6,7,7,8,8,8-tridecafluoro-1-octanol Capstone 62U: 3,3,4,4,5,5,6,6,7,7,8,8,8-tridecafluorooct-1-ene FC-161-14mcyy: (E)-perfluorohept-3-ene HDMS: 1,1,1,3,3,3-hexamethyldisilazane HFO-153-10mzzy: (E)-1,1,1,4,5,5,5-heptafluoro-4-(trifluoromethyl)pent-2-ene HFO-162-13mczy: (Z)-1,1,1,2,2,4,5,5,6,6,7,7,7-tridecafluorohept-3-ene HFO-162-13mcyz: (Z)-1,1,1,2,2,3,5,5,6,6,7,7,7-tridecafluorohept-3-ene HFC-4310mee: 1,1,1,2,2,3,4,5,5,5-decafluoropentane HFX-110: tridecafluoromethoxyheptene (mixture of isomers)

Foamable Compositions and Process of Preparing a Foam

The present application provides processes of forming a foam, comprising reacting a foamable composition comprising a blowing agent and one or more nucleating agents, under conditions effective to form a foam. As used herein, the nucleating agents serve primarily to increase cell count and decrease cell size in the foam.

In some embodiments, the nucleating agent is selected from the group consisting of HFO-162-13mczy;

HFO-162-13mcyz;

(E)-1,1,1,2,2,3,5,5,6,6,7,7,7-tridecafluoro-4-methoxyhept-3-ene;

(E)-1,1,1,2,2,4,5,5,6,6,7,7,7-tridecafluoro-3-methoxyhept-3-ene;

1,1,1,2,2,3,4,5,6,6,7,7,7-tridecafluoro-5-methoxyhept-3-ene;

(Z)-1,1,1,2,2,3,4,5,6,6,7,7,7-tridecafluoro-5-methoxyhept-3-ene;

(E)-1,1,1,2,2,3,4,5,6,6,7,7,7-tridecafluoro-5-methoxyhept-3-ene;

1,1,1,2,3,4,5,5,6,6,7,7,7-tridecafluoro-4-methoxyhept-2-ene;

(Z)-1,1,1,2,3,4,5,5,6,6,7,7,7-tridecafluoro-4-methoxyhept-2-ene;

(E)-1,1,1,2,3,4,5,5,6,6,7,7,7-tridecafluoro-4-methoxyhept-2-ene;

(Z)-1,1,1,2,2,4,5,5,6,6,7,7,7-tridecafluoro-3-methoxyhept-3-ene;

(Z)-1,1,1,2,2,3,5,5,6,6,7,7,7-tridecafluoro-4-methoxyhept-3-ene;
HFC-4310mee;
HFO-153-10mzzy;
HFO-153-10mczz
FC-161-14mcyy;
3,3,4,4,5,5,6,6,6-nonafluorohex-1-ene;
3,3,4,4,5,5,6,6,7,7,8,8,8-tridecafluoro-1-octanol and
3,3,4,4,5,5,6,6,7,7,8,8,8-tridecafluorooct-1-ene; or any mixture thereof.

In some embodiments, the nucleating agent is HFO-162-13mczy. In some embodiments, the nucleating agent is HFO-162-13mcyz. In some embodiments, the nucleating agent is one or more of the isomers of tridecafluoromethoxyheptene. In some embodiments, the nucleating agent is HFC-4310mee. In some embodiments, the nucleating agent is HFO-153-10mzzy. In some embodiments, the nucleating agent is FC-161-14mcyy. In some embodiments, the nucleating agent is 3,3,4,4,5,5,6,6,6-nonafluorohex-1-ene. In some embodiments, the nucleating agent is 3,3,4,4,5,5,6,6,7,7,8,8,8-tridecafluorooct-1-ene.

In some embodiments, the nucleating agent is selected from a mixture of two or more of
HFO-162-13mczy;
HFO-162-13mcyz;
(E)-1,1,1,2,2,3,5,5,6,6,7,7,7-tridecafluoro-4-methoxyhept-3-ene;
(E)-1,1,1,2,2,4,5,5,6,6,7,7,7-tridecafluoro-3-methoxyhept-3-ene;
1,1,1,2,2,3,4,5,6,6,7,7,7-tridecafluoro-5-methoxyhept-3-ene;
(Z)-1,1,1,2,2,3,4,5,6,6,7,7,7-tridecafluoro-5-methoxyhept-3-ene;
(E)-1,1,1,2,2,3,4,5,6,6,7,7,7-tridecafluoro-5-methoxyhept-3-ene;
1,1,1,2,3,4,5,5,6,6,7,7,7-tridecafluoro-4-methoxyhept-2-ene;
(Z)-1,1,1,2,3,4,5,5,6,6,7,7,7-tridecafluoro-4-methoxyhept-2-ene;
(E)-1,1,1,2,3,4,5,5,6,6,7,7,7-tridecafluoro-4-methoxyhept-2-ene;
(Z)-1,1,1,2,2,4,5,5,6,6,7,7,7-tridecafluoro-3-methoxyhept-3-ene;
(Z)-1,1,1,2,2,3,5,5,6,6,7,7,7-tridecafluoro-4-methoxyhept-3-ene;
HFC-4310mee;
HFO-153-10mzzy;
HFO-153-10mczz
FC-161-14mcyy;
3,3,4,4,5,5,6,6,6-nonafluorohex-1-ene;
3,3,4,4,5,5,6,6,7,7,8,8,8-tridecafluoro-1-octanol and
3,3,4,4,5,5,6,6,7,7,8,8,8-tridecafluorooct-1-ene.

In some embodiments, the foamable composition comprises about 1 to about 5 parts by weight polyol of the one or more nucleating agents, for example, about 1 to about 4, about 1 to about 3, about 1 to about 2, about 2 to about 5, about 2 to about 4, about 2 to about 3, about 3 to about 5, about 3 to about 4, or about 4 to about 5 parts by weight polyol. In some embodiments, the foamable composition comprises about 3 to about 4 parts by weight polyol of the one or more nucleating agents. In some embodiments, the foamable composition comprises about 3.6 parts by weight polyol of the one or more nucleating agents.

In some embodiments, the foamable composition comprises about 0.1 to about 5 weight percent of the one or more nucleating agents, for example, about 0.1 to about 4, about 0.1 to about 3, about 0.1 to about 2, about 0.1 to about 1, about 1 to about 5, about 1 to about 4, about 1 to about 3, about 1 to about 2, about 2 to about 5, about 2 to about 4, about 2 to about 3, about 3 to about 5, about 3 to about 4, or about 4 to about 5 weight percent of the one or more nucleating agents. In some embodiments, the foamable composition comprises about 0.5 to about 3 weight percent of the one or more nucleating agents. In some embodiments, the foamable composition comprises about 1 weight percent of the one or more nucleating agents.

In some embodiments, the foamable composition comprises a blowing agent selected from the group consisting of cyclopentane, n-pentane, isopentane, HFO-1336mzz-E, HFO-1336mzz-Z, HCFC-1233zd, HCFC-1224yd, HFO-1234ze, CFO-1112, HFC-245fa, and HFC-365mfc, or any mixture thereof.

In some embodiments, the foamable composition comprises a blowing agent which is cyclopentane. In some embodiments, the foamable composition comprises about 10 to about 15 weight percent cyclopentane, for example, about 10 to about 14, about 10 to about 13, about 10 to about 12, about 10 to about 11, about 11 to about 15, about 11 to about 14, about 11 to about 13, about 11 to about 12, about 12 to about 15, about 12 to about 14, about 12 to about 13, about 13 to about 15, about 13 to about 14, or about 14 to about 15 weight percent cyclopentane. In some embodiments, the foamable composition comprises about 14 to about 15 weight percent cyclopentane.

In some embodiments, the foamable composition comprises a blowing agent comprising:
(a) cyclopentane; and
(b) a second component selected from HFO-1336mzz-Z, HFO-1336mzz-E, and HCFC-1233zd.

In some embodiments, the blowing agent comprises cyclopentane and HFO-1336mzz-Z.

In some embodiments, the blowing agent comprises about 40 to about 80 weight percent cyclopentane, for example, about 40 to 70, about 40 to 60, about 40 to 50, about 50 to 80, about 50 to 70, about 50 to 60, about 60 to 80, about 60 to 70, or about 70 to 80 weight percent cyclopentane.

In some embodiments, the blowing agent comprises about 60 to about 20 weight percent HFO-1336mzz-Z, for example, about 60 to about 30, about 60 to about 40, about 60 to about 50, about 50 to about 20, about 50 to about 30, about 50 to about 40, about 40 to about 20, about 40 to about 30, or about 30 to about 20 weight percent HFO-1336mzz-Z.

In some embodiments, the blowing agent comprises about 40 to about 80 weight percent cyclopentane and about 60 to about 20 weight percent HFO-1336mzz-Z. In some embodiments, the blowing agent comprises about 25 to about 35 weight percent cyclopentane and about 65 to about 75 weight percent HFO-1336mzz-Z. In some embodiments, the blowing agent comprises about 30 weight percent cyclopentane and about 70 weight percent HFO-1336mzz-Z.

In some embodiments, the blowing agent comprises cyclopentane and HFO-1336mzz-E.

In some embodiments, the blowing agent comprises about 90 to about 50 weight percent cyclopentane, for example, about 90 to about 60, about 90 to about 70, about 90 to about 80, about 80 to about 50, about 80 to about 60, about 80 to about 70, about 70 to about 50, about 70 to about 60, or about 60 to about 50 weight percent cyclopentane.

In some embodiments, the blowing agent comprises about 10 to about 50 weight percent HFO-1336mzz-E, for example, about 10 to about 40, about 10 to about 30, about 10 to about 20, about 20 to about 50, about 20 to about 40, about 20 to about 30, about 30 to about 50, about 30 to about 40, or about 40 to about 50 weight percent HFO-1336mzz-E.

In some embodiments, the blowing agent comprises about 90 to about 50 weight percent cyclopentane and about 10 to about 50 weight percent HFO-1336mzz-E. In some embodiments, the blowing agent comprises about 90 to about 99 weight percent cyclopentane and about 1 to about 10 weight percent HFO-1336mzz-E. In some embodiments, the blowing agent comprises about 95 weight percent cyclopentane and about 5 weight percent HFO-1336mzz-E.

In some embodiments, the blowing agent comprises cyclopentane and HCFC-1233zd.

In some embodiments, the blowing agent comprises about 70 to about 30 weight percent cyclopentane, for example, about 70 to about 40, about 70 to about 50, about 70 to about 60, about 60 to about 30, about 60 to about 40, about 60 to about 50, about 50 to about 30, about 50 to about 40, or about 40 to about 30 weight percent cyclopentane.

In some embodiments, the blowing agent comprises about 30 to about 70 weight percent HCFC-1233zd, for example, about 30 to about 60, about 30 to about 50, about 30 to about 40, about 40 to about 70, about 40 to about 60, about 40 to about 50, about 50 to about 70, about 50 to about 60, or about 60 to about 70 weight percent HCFC-1233zd.

In some embodiments, the blowing agent comprises about 70 to about 30 weight percent cyclopentane and about 30 to about 70 weight percent HCFC-1233zd. In some embodiments, the blowing agent comprises about 90 to about 99 weight percent cyclopentane and about 1 to about 10 weight percent HCFC-1233zd. In some embodiments, the blowing agent comprises about 95 weight percent cyclopentane and about 5 weight percent HCFC-1233zd.

In some embodiments, the foamable composition further comprises one or more polyols. In some embodiments, one or more additives can be included in the foamable compositions described herein. For example, the foamable compositions can further comprise one or more additives that include, but are not limited to, catalysts, surfactants, flame retardants, stabilizers, preservatives, chain extenders, crosslinkers, water, colorants, antioxidants, reinforcing agents, fillers, antistatic agents, nucleating agents, smoke suppressants, and pigments.

In some embodiments, the foamable composition further comprises one or more additional components selected from at least one polyol, at least one catalyst, at least one surfactant, water, at least one flame retardant agent, and at least one nucleating agent.

In some embodiments, the foamable composition comprises at least one polyol. In some embodiments, the polyol comprises any ratio of polyester polyol to polyether polyol. One or more of each polyester polyol and polyether polyol may be used. In some embodiments, the polyol comprises a weight ratio of about 1:1 to about 2:1 polyester polyol to polyether polyol. In some embodiments, the polyol comprises a weight ratio of about 1:1 polyester polyols to polyether polyols. In some embodiments, the polyol comprises a weight ratio of about 1:1 polyester polyol to polyether polyol.

In some embodiments, the polyol is a polyester polyol. Suitable polyester polyols include those prepared by reacting a carboxylic acid and/or a derivative thereof or a polycarboxylic anhydride with a polyhydric alcohol. The polycarboxylic acids can be any of the known aliphatic, cycloaliphatic, aromatic, and/or heterocyclic polycarboxylic acids and can be substituted (e.g., with halogen atoms) and/or unsaturated. Examples of suitable polycarboxylic acids and anhydrides include oxalic acid, malonic acid, glutaric acid, pimelic acid, succinic acid, adipic acid, suberic acid, azelaic acid, sebacic acid, phthalic acid, isophthalic acid, terephthalic acid, trimellitic acid, trimellitic acid anhydride, pyromellitic dianhydride, phthalic acid anhydride, tetrahydrophthalic acid anhydride, hexahydrophthalic acid anhydride, endomethylene tetrahydrophthalic acid anhydride, glutaric acid anhydride acid, maleic acid, maleic acid anhydride, fumaric acid, and dimeric and trimeric fatty acids, such as those of oleic acid which may be in admixture with monomeric fatty acids. Simple esters of polycarboxylic acids can also be used, such as terephthalic acid dimethylester, terephthalic acid bisglycol and extracts thereof. The polyhydric alcohols suitable for the preparation of polyester polyols can be aliphatic, cycloaliphatic, aromatic, and/or heterocyclic. The polyhydric alcohols optionally can include substituents which are inert in the reaction, for example, chlorine and bromine substituents, and/or may be unsaturated. Suitable amino alcohols, such as monoethanolamine, diethanolamine or the like can also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol, and trimethylolpropane.

Other suitable polyester polyols include, but are not limited to, aromatic polyester polyols, e.g., those made by transesterifying polyethylene terephthalate (PET) scrap with a glycol such as diethylene glycol, or made by reacting phthalic anhydride with a glycol. The resulting polyester polyols can be reacted further with ethylene and/or propylene oxide to form an extended polyester polyol containing additional internal alkyleneoxy groups.

In some embodiments, the polyester polyol has an average molecular weight of from about 400 g/mol to about 500 g/mol, such as from about 450 g/mol to about 475 g/mol. In some embodiments, the polyester polyol is an aromatic polyester polyol with an average hydroxyl number of from about 200 to about 325, such as from about 235 to about 265, or about 230 to about 250, or about 295 to about 315.

Exemplary polyester polyols that are commercially available include the polyester polyols Stepanpol® PS-2352 (Stepan Company, Chicago, IL), Stepanpol® PS-2502A (Stepan Company, Chicago, IL), Stepanpol® PS-2412 (Stepan Company, Chicago, IL), Stepanpol® PS-2520 (Stepan Company, Chicago, IL), Stepanpol® PS-3021 (Stepan Company, Chicago, IL), Stepanpol® PS-3024 (Stepan Company, Chicago, IL), Terol® 256 (Huntsman, The Woodlands, TX), and Terol® 925 (Huntsman, The Woodlands, TX), Terol® 250 (Huntsman, The Woodlands, TX), Terol® 305 (Huntsman, The Woodlands, TX), Terol® 563 (Huntsman, The Woodlands, TX), Terol® 649 (Huntsman, The Woodlands, TX), Terol® 1465 (Huntsman, The Woodlands, TX), Isoexter® TB-305 (COIM, West Deptford, NJ), Isoexter® TB-306 (COIM, West Deptford, NJ), Terate® HT5510 (Invista), Terate® 5232 (Invista), Terate® 5100 (Invista), Terate® 5150 (Invista), Terate® 5170 (Invista), Carpol® PES-240 (Carpenter Co., Richmond, VA), Carpol® PES-265 (Carpenter Co., Richmond, VA), Carpol® PES-305 (Carpenter Co., Richmond, VA), Carpol® PES-295 (Carpenter Co., Richmond, VA), In some embodiments, the foamable composition comprises one or more polyether polyols. Examples of suitable polyether polyols include, but are not limited to, polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16 or 3 to 8 hydroxyl groups as present, for example, in glycerol, pentaerythritol and carbohydrates such as sorbitol, glucose, sucrose and the like polyhydroxy compounds. Suitable polyether polyols can also include aliphatic or aromatic amine-based polyols. Exemplary polyether polyols that are commercially available include the polyether polyols JEFFOL® PPG-400 (Huntsman, The Woodlands, TX), JEFFOL® PPG-1000 (Huntsman, The Woodlands, TX), JEFFOL® FX31-240 (Huntsman, The Woodlands, TX), JEFFOL® G31-28 (Huntsman, The Woodlands, TX), JEFFOL® R-425X (Huntsman, The Woodlands, TX), JEFFOL® R-470X (Huntsman, The Woodlands, TX), JEFFOL® S-490 (Huntsman, The Woodlands, TX), JEFFOL® SG-360 (Huntsman, The Woodlands, TX), JEFFOL® SG-522 (Huntsman, The Woodlands, TX), Carpol® PGP-400 (Carpenter Co., Richmond, VA), Carpol® PGP-1000 (Carpenter Co., Richmond, VA), Carpol® GP-700 (Carpenter Co., Richmond, VA), Carpol® GP-6015 (Carpenter Co., Richmond, VA), Carpol® MX-425 (Carpenter Co., Richmond, VA), Carpol® MX-470 (Carpenter Co., Richmond, VA), Carpol® GSP-355 (Carpenter Co., Richmond, VA), Carpol® GSP-520 (Carpenter Co., Richmond, VA), Carpol® SP-477 (Carpenter Co., Richmond, VA), VORANOL® 220-260 (Dow Chemical, Midland, MI), VORANOL® 220-110 (Dow Chemical, Midland, MI), VORANOL® 230-238 (Dow Chemical, Midland, MI), VORANOL® 232-027 (Dow Chemical, Midland, MI), VORANOL® 470 (Dow Chemical, Midland, MI), VORANOL® 360 (Dow Chemical, Midland, MI), VORANOL® 520 (Dow Chemical, Midland, MI), VORANOL® 391 (Dow Chemical, Midland, MI), Pluracol® P410R (BASF, Lemforde, Germany), Pluracol® P1010 (BASF, Lemforde, Germany), Pluracol® GP730 (BASF, Lemforde, Germany), Pluracol® 220 (BASF, Lemforde, Germany), Lupranol® 3422 (BASF, Lemforde, Germany), Pluracol® SG-360 (BASF, Lemforde, Germany), Pluracol® 824 (BASF, Lemforde, Germany), Pluracol® 735 (BASF, Lemforde, Germany), ARCOL® PPG-425 (Covestro, Leverkusen, Germany), ARCOL® 1000 (Covestro, Leverkusen, Germany), ARCOL® LHT-240 (Covestro, Leverkusen, Germany), MULTRANOL® 9139 (Covestro, Leverkusen, Germany), MULTRANOL® 3901 (Covestro, Leverkusen, Germany), MULTRANOL® 4034 (Covestro, Leverkusen, Germany), Poly-G® 20-265 (Monument Chemical, Indianapolis, IN), Poly-G® 20-112 (Monument Chemical, Indianapolis, IN), Poly-G® 30-240 (Monument Chemical, Indianapolis, IN), Poly-G® 85-29 (Monument Chemical, Indianapolis, IN), Poly-G® 73-490 (Monument Chemical, Indianapolis, IN), Poly-G® 74-376 (Monument Chemical, Indianapolis, IN), and Poly-G® 74-532.

In some embodiments, the polyether polyol is a medium functional polyether polyol. For example, the polyether polyol has a functionality of about four. In some embodiments, the polyether polyol is sucrose/glycerin initiated. In some embodiments, the polyether polyol is a Mannich-based polyether polyol. As used herein, the term "Mannich-based polyol" refers to an aromatic polyol obtained by alkoxylation with propylene oxide and/or ethylene oxide of the Mannich bases obtained by classical Mannich reaction between phenols (e.g., phenol, p-nonylphenol), formaldehyde and alkanolamines (diethanolamine, diisopropanolamine, monoethanolamine, monoisopropanolamine, etc.). Exemplary commercially available polyether polyols include Voranol® 490 (Dow Chemical, Midland, MI), Carpol® MX-425 (Carpenter Co., Richmond, VA), and Carpol® MX-470 (Carpenter Co., Richmond, VA).

In some embodiments, the polyol is a polyester polyol having a hydroxyl number of from about 200 mg KOH/g to about 300 mg KOH/g.

In some embodiments, the polyol is a polyester polyol having a hydroxyl number of from about 230 mg KOH/g to about 250 mg KOH/g.

In some embodiments, the foamable composition described herein is soluble in the polyol blend. In some embodiments, solubility is measured by visual assessment.

In some embodiments, the foamable composition comprises at least one catalyst for the reaction of the polyol with the polyisocyanate (i.e., the A-side). Any suitable urethane catalyst can be used, including amine-based compounds, such as tertiary amine compounds, for example, dimethylethanolamine and bis(2-dimethylamino ethyl) ether, and organometallic compounds. Such catalysts are used in an amount which increases the rate of reaction of the polyisocyanate. By way of example, typical amounts of catalyst used are about 0.1 to about 5 parts of catalyst per 100 parts by weight of polyol. In some embodiments, the foamable compositions comprise a gel catalyst, such as a non-nucleophilic gel catalyst. In some embodiments, the foamable compositions comprise a blow catalyst. In some embodiments, the foamable compositions comprise a metal catalyst. In some embodiments, the foamable composition comprises a metal catalyst and an amine catalyst.

Exemplary catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine salts, may also optionally be employed herein. Such catalysts are used in an amount which measurably increases the rate of reaction of the polyisocyanate. Typical amounts of catalysts are about 0.1% to about 5% by weight based on the total weight of all foaming ingredients. Non-limiting examples of catalysts include POLYCAT® 8, N,N-dimethylcyclohexylamine from Evonik Industries, POLYCAT® 5, pentamethyldiethylenetriamine from Evonik Industries, and CURITHANE® 52, 2-methyl(n-methyl amino b-sodium acetate nonyl phenol) from Evonik Industries, POLYCAT® 30 (Evonik Industries), POLYCAT® 36 (Evonik Industries), POLYCAT® 46 (Evonik Industries), POLYCAT® 77 (Evonik Industries), Dabco® 2039 (Evonik Industries), Dabco® 204 (Evonik Industries), Dabco® 2040 (Evonik Industries), Dabco® BL-19 (Evonik Industries), Dabco® BL-17 (Evonik Industries), Dabco® T (Evonik Industries), Dabco® T-125 (Evonik Industries), Dabco® K-15 (Evonik Industries), Dabco® TMR (Evonik Industries), Dabco® TMR-2 (Evonik Industries), Dabco® TMR-3 (Evonik Industries), Dabco® TMR-30 (Evonik Industries), Bicat® 8210 (The Shepard Chemical Company, Cincinnati, OH), Bicat® 8840 (The Shepard Chemical Company, Cincinnati, OH), Bicat® 8842 (The Shepard Chemical Company, Cincinnati, OH), K-Kat® XK 651 (King Industries, Norwalk, CT), K-Kat® 614 (King Industries, Norwalk, CT), K-Kat® 672 (King Industries, Norwalk, CT), K-Kat® 604 (King Industries, Norwalk, CT), Niax® UL1 (Momentive Performance Materials Inc., Waterford, NY), Niax® UL22, Niax® UL1 (Momentive Performance Materials Inc., Waterford, NY, Jeffamine® D-230 (Huntsman, The Woodlands, TX), Jeffamine® T403 (Huntsman, The Woodlands, TX), Jeffamine® D2000 (Huntsman, The Woodlands, TX), Jeffamine® T5000 (Huntsman, The Woodlands, TX), Jeffcat® PMDETA (Huntsman, The Woodlands, TX), Jeffcat® DMCHA (Huntsman, The Woodlands, TX), ZF20 (Huntsman, The Woodlands, TX), ZF54 (Huntsman, The Woodlands, TX), tin, dibutyltin mercaptide, potassium octoate, potassium acetate, bismuth, bismuth carboxylate mixtures, and the like.

In some embodiments, the foamable composition comprises a surfactant. Suitable surfactants can comprise a liquid or solid organosilicone compound. Other surfactants include polyethylene glycol ethers of long chain alcohols, tertiary amine or alkanolamine salts of long chain alkyl acid sulfate esters, alkyl sulfonic esters, and alkyl arylsulfonic acids. In some embodiments, the surfactant is a silicone surfactant. In some embodiments, the surfactant is a silicone polyether surfactant. In some embodiments, the surfactant is Dabco® DC5585.

In some embodiments, the foamable composition comprises a flame retardant agent. Useful flame retardant agents include, but are not limited to, tris(2-chloroethyl) phosphate, tris(2-chloropropyl) phosphate, tris(1-chloro-2-propyl) phosphate (TCPP), tris(2,3-dibromopropyl) phosphate, tris (1,3-dichloropropyl) phosphate, diammonium phosphate, halogenated aromatic compounds, antimony oxide, aluminum trihydrate, polyvinyl chloride, bromine-containing diester/ether diols of tetrabromophthalic anhydride, such as a mixed ester of tetrabromophthalic anhydride with diethylene glycol and propylene glycol. Exemplary commercially available flame retardant agents include Saytex® RB-79, a reactive bromine-containing diester/ether diol of tetrabromophthalic anhydride (Albemarle Corporation, Baton Rouge, LA). In some embodiments, the flame retardant agent is tris(1-chloro-2-propyl) phosphate (TCPP).

In some embodiments, the foamable composition comprises water. In some embodiments, the foamable composition comprises a blowing agent selected from the group consisting of cyclopentane, n-pentane, isopentane, HFO-1336mzz-E, HFO-1336mzz-Z, HCFC-1233zd, HCFO-1224yd, HFO-1234ze, CFO-1112, HFC-245fa, and HFC-365mfc, or any mixture thereof, a nucleating agent as described herein, and water.

In some embodiments, the foamable composition comprises a blowing agent which is cyclopentane, a nucleating agent as described herein, and water.

In some embodiments, the foamable composition comprises a blowing agent comprising (a) cyclopentane; and (b) a second component selected from HFO-1336mzz-Z, HFO-1336mzz-E, and HCFC-1233zd; a nucleating agent as described herein, and water.

In some embodiments, the process of forming a foam provided herein comprises: (a) adding a foamable disclosed herein (e.g., a B-side composition) to a composition comprising an isocyanate (e.g., an A-side composition); and (b) reacting the compositions under conditions effective to form a foam. The isocyanate or isocyanate-containing mixture can include the isocyanate and auxiliary chemicals, like catalysts, surfactants, stabilizers, chain extenders, cross-linkers, water, fire retardants, smoke suppressants, pigments, coloring materials, fillers, etc. In some embodiments, the isocyanate is PAPI-27. Any of the methods well known in the art, such as those described in "Polyurethanes Chemistry and Technology," Volumes I and II, Saunders and Frisch, 1962, John Wiley and Sons, New York, N.Y., which is incorporated herein by reference, can be used or adapted for use in accordance with the compositions disclosed herein.

In the process of making a polyisocyanate-based foam, the polyol(s), polyisocyanate, and other components are contacted, thoroughly mixed, and permitted to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and polyols. For example, it is often useful to prepare the foamable composition (e.g., the B-side composition) disclosed herein, and then contact this composition with the polyisocyanate.

In some embodiments, the foamable composition provided herein (e.g., a B-side composition) can be used to blow thermoplastic foams, such as polystyrene, polyethylene foams, including low-density polyethylene foams, or polypropylene foams. Any of a wide range of conventional methods for blowing such thermoplastic foams can be adapted for use herein. Thus, disclosed herein are thermoplastic foams, such as polystyrene, polyethylene (PE), for example, low density PE, or polypropylene (PP), formed using the foamable compositions disclosed herein.

It is understood that the present application further provides a foamable composition as described herein. In some embodiments, the foamable composition described herein is useful in one or more of the processes described herein.

Foams

The present application further provides a foam prepared according to one or more processes provided herein. The types of foam produced can include, for example, closed cell foams, open cell foams, rigid foams, flexible foams, and integral skin. In some embodiments, disclosed herein are foams prepared from the foamable compositions (e.g., B-side compositions). In some embodiments, the foam is a spray foam. In some embodiments, the foam is a thermoset foam.

In some embodiments, the foam is a polyurethane foam or a polyisocyanurate foam. In some embodiments, the foam is a closed cell foam. In some embodiments, the foam is a closed cell polyisocyanurate foam. In some embodiments, the foam is a rigid closed cell polyisocyanurate foam. In some embodiments, the foam is a rigid closed cell polyurethane foam. In some embodiments, the rigid closed-cell celled polyisocyanate-based foams are useful in spray insulation, as foam-in-place appliance foams, rigid insulating board stock, or in laminates.

In some embodiments, the foams disclosed herein can be used in a wide variety of applications, including, but not limited to, appliance foams including refrigerator foams, freezer foams, refrigerator/freezer foams, panel foams, and other cold or cryogenic manufacturing applications. In some embodiments, the foams formed from the compositions disclosed herein have exceptional thermal performance, such as can be measured by the K-factor. "K-factor," as used herein, represents the foam's thermal conductivity or ability to conduct heat. The K-factor is a measure of heat that passes through one square foot of material that is one-inch-thick in one hour. Typically, the lower the K-factor, the better the insulation.

In some embodiments, the foam provided herein has a K-factor of about 0.135 Btu·in/ft$^2$·h·° F. or less at about 20° F. In some embodiments, the foam provided herein has a K-factor of about 0.134 Btu·in/ft$^2$·h·° F. or less at about 20° F.

In some embodiments, the foam provided herein the foam has a K-factor of from about 0.131 Btu·in/ft$^2$·h·° F. to about 0.134 Btu·in/ft$^2$·h·° F. at about 20° F., for example, about 0.131 to about 0.133, about 0.131 to about 0.132, about 0.132 to about 0.134, about 0.132 to about 0.133, or about 0.132 to about 0.134 Btu·in/ft$^2$·h·° F. at about 20° F.

In some embodiments, the foam provided herein has a K-factor of about 0.147 Btu·in/ft$^2$·h·° F. or less at about 70° F. In some embodiments, the foam provided herein has a K-factor of about 0.146 Btu·in/ft$^2$·h·° F. or less at about 70° F.

In some embodiments, the foam provided herein has a K-factor of from about 0.140 Btu·in/ft$^2$·h·° F. to 0.146 about at about 70° F., for example, about 0.140 to about 0.145, about 0.140 to about 0.144, about 0.140 to about 0.143, about 0.140 to about 0.142, about 0.140 to about 0.141, about 0.141 to about 0.146, about 0.141 to about 0.145, about 0.141 to about 0.144, about 0.141 to about 0.143, about 0.141 to about 0.142, about 0.142 to about 0.146, about 0.142 to about 0.145, about 0.142 to about 0.144, about 0.142 to about 0.143, about 0.143 to about 0.146, about 0.143 to about 0.145, about 0.143 to about 0.144, about 0.144 to about 0.146, about 0.144 to about 0.145, or about 0.145 to about 0.146 Btu·in/ft$^2$·h·° F. at about 70° F.

In some embodiments, the foam prepared according to a process provided herein exhibits about 0.10% to about 5% improved K-factor compared to an analogous foam prepared using cyclopentane as the blowing agent, for example, about 0.1% to about 4%, about 0.10% to about 3%, about 0.10% to about 2%, about 0.10% to about 1%, about 0.1% to about 0.5%, about 0.5% to about 5%, about 0.5% to about 4%, about 0.5% to about 3%, about 0.5% to about 2%, about 0.5% to about 1%, about 1% to about 5%, about 1% to about 4%, about 1% to about 3%, about 1% to about 2%, about 2% to about 5%, about 2% to about 4%, about 2% to about 3%, about 3% to about 5%, about 3% to about 4%, about 4% to about 5% improved K-factor compared to an analogous foam prepared using cyclopentane as the blowing agent (i.e., an foam prepared using the same A-side+B-side mixture, wherein the B-side mixture does not contain the blowing agent composition comprising a nucleating agent as described herein).

In some embodiments, the foams produced from the foamable compositions disclosed herein have a density of from about 2.3 to about 3.5 g/cm$^3$. For example, the foam can have a density of about 2.3, 2.4, 2.5, 2.6, 2.7, 2.8, 2.9, 3.0, 3.1, 3.2, 3.3, 3.4, or 3.5 g/cm$^3$. In some embodiments, the foams produced from the foamable compositions disclosed herein have a density of from about 2.3 to about 2.7 g/cm$^3$.

Representative foamed products that can be made in accordance with the present disclosure include, for example: (1) polystyrene foam sheet for the production of disposable thermoformed packaging materials, e.g., as disclosed in U.S. Pat. No. 5,204,169; (2) extruded polystyrene foam boards for use as residential and industrial sheathing and roofing materials, which may be from about 0.5 to 6 inches (1.25 to 15 cm) thick, up to 4 feet (122 cm) wide, with cross-sectional areas of from 0.17 to 3 square feet (0.016 to 0.28 square meter), and up to 27 feet (813 meters) long, with densities of from about 1.5 to 10 pounds per cubic foot (pcf) (25 to 160 kilograms per cubic meter (kg/m$^3$); (3) expandable foams in the form of large billets which may be up to about 2 feet (61 cm) thick, often at least 1.5 feet 46 cm) thick, up to 4 feet (1.22 meters) wide, up to 16 feet (4.8 meters) long, having a cross-sectional area of about 2 to 8 square feet (0.19 to 0.74 square meter) and a density of from 6 to 15 pcf (96 to 240 kg/m$^3$). Such foamed products are more fully described by Stockdopole and Welsh in the Encyclopedia of Polymer Science and Engineering, vol. 16, pages 193-205, John Wiley & Sons, 1989; hereby incorporated by reference.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

The following "control" compositions are referenced throughout the Examples and were used as the basis for comparative analyses. The control represents 100% cyclopentane as blowing agent in a generic PIR formulation in the absence of nucleating agent.

TABLE A

Control Composition

| Component | Weight (g) | pbw | Weight Percent (%) |
|---|---|---|---|
| B-side | | | |
| Terol 250 | 74.4 | 80.00 | 56.82 |
| Voranol 360 | 18.6 | 20.00 | 14.20 |
| Polycat 8 | 0.465 | 0.50 | 0.36 |
| Tegostab B 84501 | 3.255 | 3.50 | 2.50 |
| Dabco K-15 | 1.116 | 1.2 | 0.85 |
| Polycat 5 | 0.093 | 0.1 | 0.07 |
| TCPP | 13.95 | 15 | 10.65 |
| Water | 0.465 | 0.50 | |
| Total B-side without Blowing Agent | 112.344 | 120.80 | |
| Cyclopentane | 18.6 | 20 | 14.20 |
| Total B-side with Blowing Agent | 130.944 | | |
| A-Side | | | |
| PAPI ® 27 Isocyanate | 204.6012 | 220.00 | |
| Total A-side + B-side | 335.55 | 360.80 | |

Example 1. General Preparation of A-Side and B-Side Compositions

The formulations described in the Examples were prepared using the parts per hundred polyol (pphp) method (i.e., parts by weight (pbw)). The prepared formulations had an ISO index of 300 and pbw to measured weight ratio of 0.85 and the adjusted blowing agent blends were kept constant on a total mole basis.

The B-side components were weighed on a mass balance and mixed together in a 1 L plastic beaker, then the physical blowing agents (e.g., the HFO and cyclopentane) were chilled down below their respective boiling points. After cooling, the blowing agents were added to the B-side mixture until fully incorporated.

The Isocyanate (A-side), primarily PAPI 27, was weighed in a 500 mL plastic beaker with an extra 15 weight percent (wt %) for sufficient head-room pouring. After weighing the A-side and B-side, the A-side was poured into the B-side mixture.

The resulting foams were placed under an air-hood for 24 h to completely finish the polyurethane reaction. Samples were cut into 6"×6"×1.5" blocks with a bandsaw cutting machine. These foam blocks were tested for thermal conductivity utilizing a heat flow meter per ASTM C-518. After testing, data values were compiled for analysis.

Example 2. Thermal Performance Analysis

Figure 2:
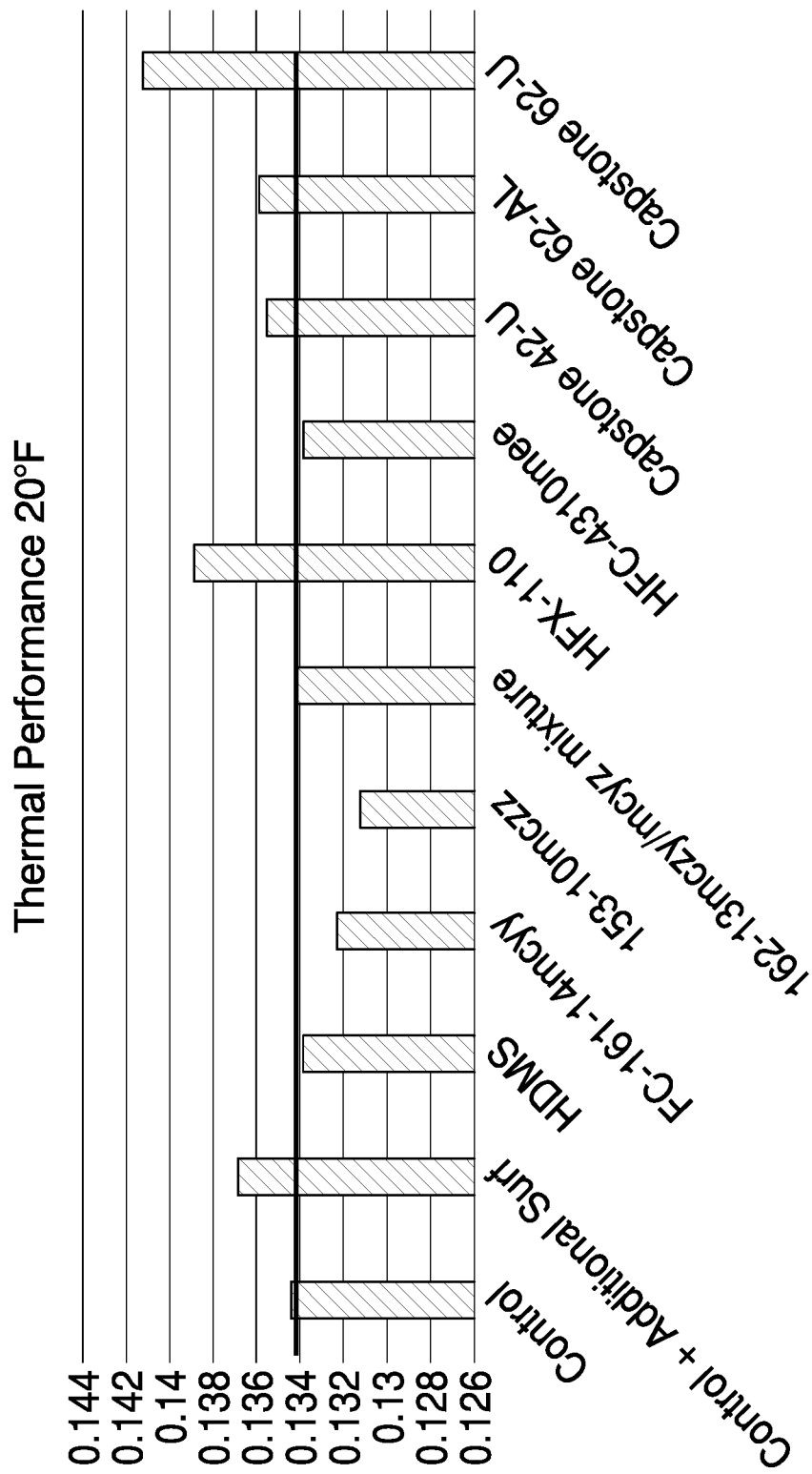

Table 1 shows a comparison thermal performance of representative foams prepared using the generic PIR formulation described in Table A with various nucleating agents. The nucleating agents were formulated in the B-side (polyol) at a level to deliver 1% in the entire formulation (at 3.6 pbw polyol). The nucleating agent was first added to the cyclopentane (Cp). The Cp/nucleating agent mixture (21.97 g) was then added together to B-side. The control performance is indicated in FIGS. 1-2 by the solid horizontal line; thus any compound below this level corresponds to an improvement in K-factor.

TABLE 1

| Foamable Composition | Nucleating Agent | Density | K-factor 75° F. (Btu · in/ft² · h · ° F.) | K-factor 20° F. (Btu · in/ft² · h · ° F.) | K-factor 75° F. Improvement vs. Control (%) | K-factor 20° F. Improvement vs. Control (%) |
|---|---|---|---|---|---|---|
| Control | — | 2.45 | 0.1472 | 0.1345 | — | — |
| Control + Additional Surfactant | — | 2.53 | 0.1495 | 0.137 | −1.56 | −1.86 |
| 1 | HDMS | 2.63 | 0.1441 | 0.1339 | +2.11 | +0.45 |
| 2 | FC-161-14mcyy | 2.48 | 0.1401 | 0.1324 | +4.82 | +1.56 |
| 3 | 153-10mczz | 2.43 | 0.142 | 0.1313 | +3.53 | +2.38 |
| 4 | mixture of 162-13mczy and 162-13mcyz | 2.45 | 0.1408 | 0.1343 | +4.35 | +0.15 |
| 5 | HFX-110 | 2.50 | 0.1442 | 0.139 | +2.04 | −3.35 |
| 6 | HFC-43 10mee | 2.50 | 0.1452 | 0.1339 | +1.36 | +0.45 |
| 7 | Capstone 42-U | 2.51 | 0.1447 | 0.1356 | +1.70 | −0.82 |
| 8 | Capstone 62-AL | 2.57 | 0.1459 | 0.1359 | +0.88 | −1.04 |
| 9 | Capstone 62-U | 2.46 | 0.1454 | 0.1413 | +1.22 | −5.06 |

Example 3. Thermal Performance Analysis Using Blowing Agent Blends in the Presence of Nucleating Agents The effects of using hydrofluoroolefins (HFOs) and HFO/cyclopentane blends as blowing agents in the presence of nucleating agents was analyzed. The B-side components were weighed on a mass balance and mixed together in a 1 L plastic beaker. The B-side, minus the blowing agents, was then chilled in a 4° C. refrigerator overnight. Then the physical blowing agent was chilled down below 10° C. After cooling the blowing agent, it was added to the B-side mixture until fully incorporated. The isocyanate (A-side), primarily PAPI 27, was weighed in a 500 mL plastic beaker with an extra 15 wt % for sufficient head-room pouring, and poured into the B-side mixture. The A+B mixture was placed into a mixing head and mixed for 3 s at 4000 rpm. After mixing, the mixed A+B solution was quickly poured into a wax coated cardboard box and a timer was started. The resulting foams were placed under an air-hood for 24 hours to complete the polyurethane reaction. The foam was then cut into 8"×8"×1.5" blocks. The foam blocks were tested for thermal conductivity utilizing a heat flow meter per ASTM C-518.

The recipes for these blended blowing examples are shown in Table 2. In this case, a 70:30 molar ratio of Cp to HFO-1336mzz(Z) was examined (1:1 weight ratio).

TABLE 2

Blowing Agent Blend Compositions

| Component | Weight (g) | pbw | Weight Percent (%) |
|---|---|---|---|
| B-side | | | |
| Terol 250 | 74.4 | 80.00 | 56.82 |
| Voranol 360 | 18.6 | 20.00 | 14.20 |
| Polycat 8 | 0.465 | 0.50 | 0.36 |
| Tegostab B 84501 | 3.255 | 3.50 | 2.50 |
| Dabco K-15 | 1.116 | 1.2 | 0.85 |
| Polycat 5 | 0.093 | 0.1 | 0.07 |
| TCPP | 13.95 | 15 | 10.65 |
| Water | 0.465 | 0.50 | |
| Total B-side without Blowing Agent | 112.344 | 120.80 | |
| Cyclopentane | 13.02 | 14.0 | 9.39 |
| HFO-1336mzz(Z) | 13.05 | 14.0 | 9.39 |
| Total B-side with Blowing Agent | 138.414 | | |
| Nucleating Agent | 3.37 | 3.62 | |
| A-Side | | | |
| PAPI ® 27 Isocyanate | 204.6012 | 220.00 | |
| Total A-side + B-side | 335.55 | 360.80 | |

TABLE 3

Blowing Agent Blend Composition Results

| Foamable Composition | Nucleating Agent | Density | K-factor 75° F. (Btu · in/ft² · h · ° F.) | K-factor 20° F. (Btu · in/ft² · h · ° F.) | K-factor 75° F. Improvement vs. Control (%) | K-factor 20° F. Improvement vs. Control (%) |
|---|---|---|---|---|---|---|
| Control BL | — | 2.41 | 0.1375 | 0.1265 | — | — |
| 1 BL | HDMS | 2.51 | 0.1358 | 0.1236 | +1.24 | +2.29 |
| 2 BL | FC-161-14mcyy | 2.44 | 0.1348 | 0.1262 | +1.96 | +0.24 |
| 3 BL | 153-10mczz | 2.35 | 0.1357 | 0.1276 | +1.31 | −0.87 |
| 4 BL | Capstone 42-U | 2.38 | 0.1375 | 0.1315 | 0 | −3.95 |

Figure 3:
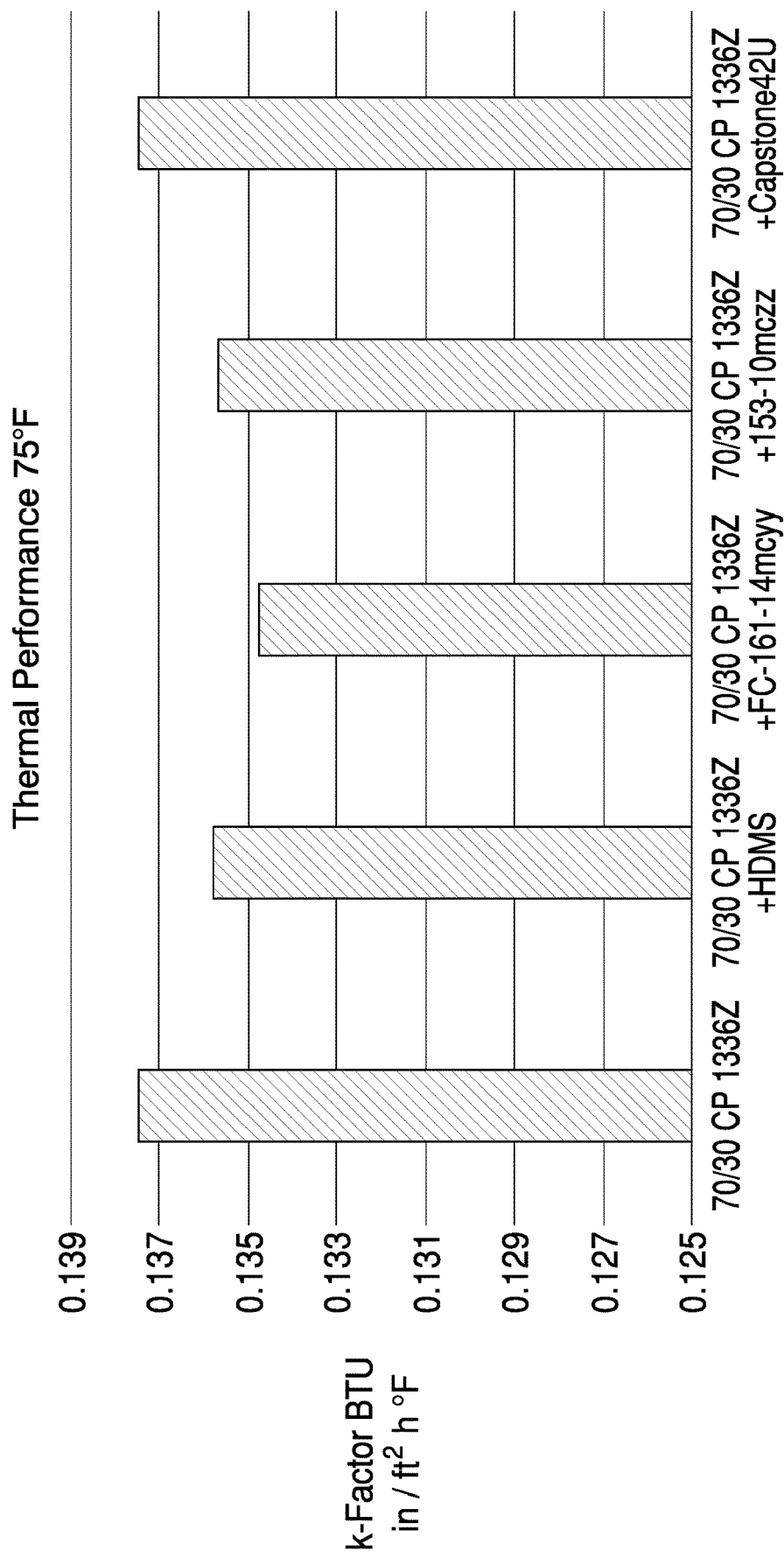
FIGS. 3-4 show a comparison of thermal performance of foams prepared with different nucleating agents using cyclopentane plus Z-1336mzz as the blowing agent.
Figure 4:
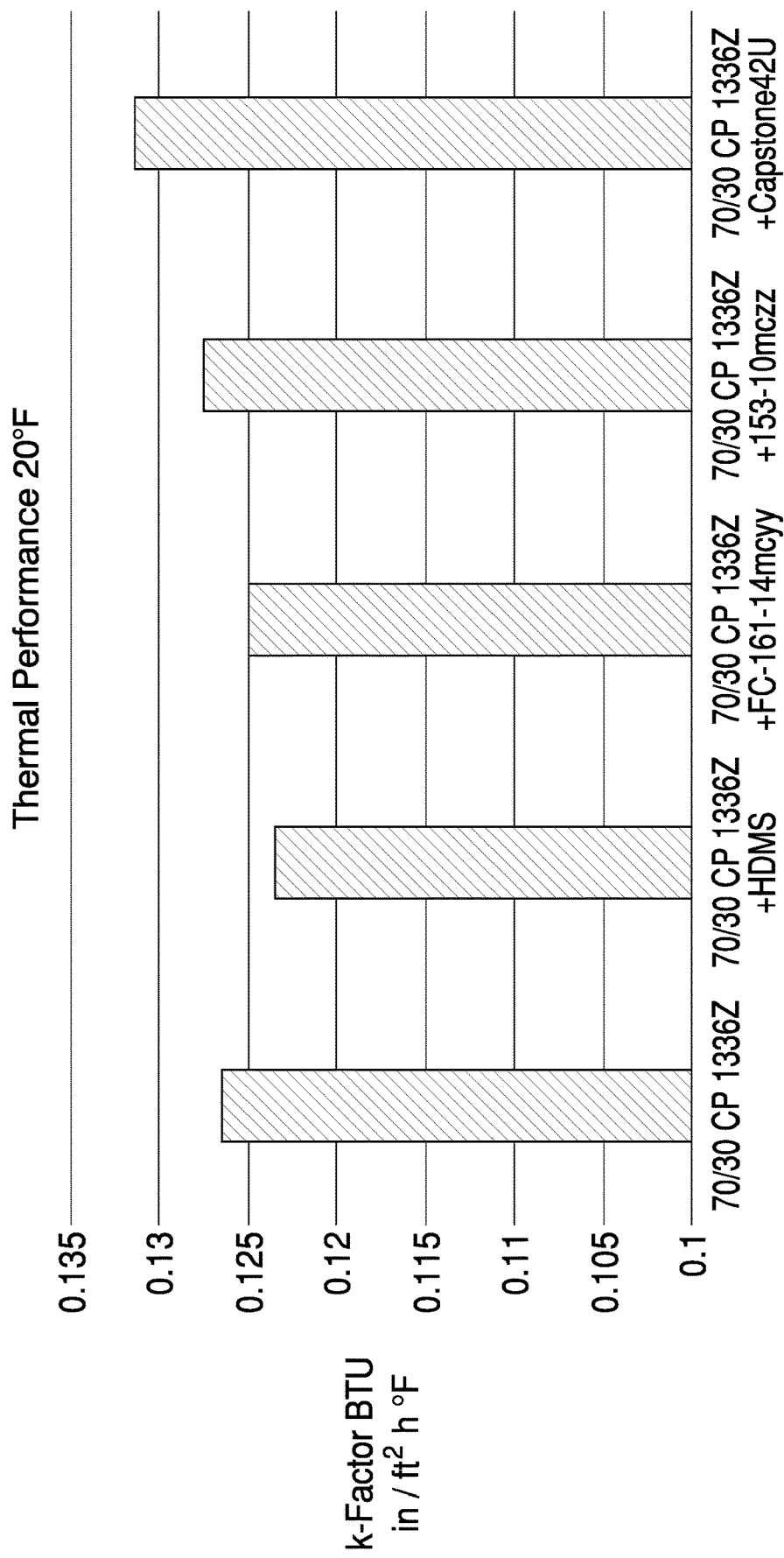

Results of these studies are listed in FIGS. 3-4. As illustrated in FIGS. 3-4, improvements in thermal performance were observed at 75° F. and 20° F. using a blowing agent molar mixture of 70% cyclopentane and 30. HFO-1336mzz(Z) in the presence of various nucleating agents, compared to pure (100%) cyclopentane.

Additional tests were performed using FC-161-14mcyy and NFP (1,1,1,2,3,4,5,5,5-nonafluoro-4-(trifluoromethyl)-2-pentene, as a control) as nucleating agents in the presence of the following blowing agents: (a) cyclopentane; (b) 95% cyclopentane/5% HFO-1336mzz(E); and (c) 95% cyclopentane/5% 1233zd-E. Thermal performance of foams prepared using these blowing agent/nucleating agent blends are shown below in Tables 4-6.

TABLE 4

| Component B-side | pphp polyol | | | | |
| --- | --- | --- | --- | --- | --- |
| | F4T3 | PFH05 | PFH15 | NFP-05 | NFP-15 |
| Stepanpol PS2352 | 100.00 | 100.00 | 100.00 | 100.00 | 100.00 |
| Dabco DC5585 | 2.25 | 2.25 | 2.25 | 2.25 | 2.25 |
| Polycat 36 | 0.40 | 0.40 | 0.40 | 0.40 | 0.40 |
| Dabco TMR-20 | 2.75 | 2.75 | 2.75 | 2.75 | 2.75 |
| TCPP | 10.00 | 10.00 | 10.00 | 10.00 | 10.00 |
| Water | 0.40 | 0.40 | 0.40 | 0.40 | 0.40 |
| Cyclopentane | 20.95 | 20.95 | 20.95 | 20.95 | 20.95 |
| 3-Perfluoroheptene | | 0.50 | 1.50 | | |
| NFP | | | | 0.50 | 1.50 |
| Total B-side | 136.75 | 137.25 | 138.25 | 136.75 | 136.75 |
| Isocyanate PAPI 27 | 198.79 | 198.79 | 198.79 | 198.79 | 198.79 |
| Total A + B | 335.54 | 336.04 | 337.04 | 335.54 | 335.54 |
| | k-Factor (Btu · in/ft2 · h · ° F. Units) | | | | |
| 75° F./24° C. | 0.1448 | 0.1423 | 0.1404 | 0.1378 | 0.1313 |
| 50° F./10° C. | 0.1440 | 0.1396 | 0.1371 | 0.1354 | 0.1263 |
| 20° F./−6.7° C. | 0.1403 | 0.1371 | 0.1358 | 0.1338 | 0.1239 |

TABLE 5

| Component B-side | pphp polyol | | | | |
| --- | --- | --- | --- | --- | --- |
| | F4T3 | PFH05 | PFH15 | NFP-05 | NFP-15 |
| Stepanpol PS2352 | 100.00 | 100.00 | 100.00 | 100.00 | 100.00 |
| Dabco DC5585 | 2.25 | 2.25 | 2.25 | 2.25 | 2.25 |
| Polycat 36 | 0.40 | 0.40 | 0.40 | 0.40 | 0.40 |
| Dabco TMR-20 | 2.75 | 2.75 | 2.75 | 2.75 | 2.75 |
| TCPP | 10.00 | 10.00 | 10.00 | 10.00 | 10.00 |
| Water | 0.40 | 0.40 | 0.40 | 0.40 | 0.40 |
| Cyclopentane | 19.86 | 19.86 | 19.86 | 19.86 | 19.86 |
| HFO-1336mzz-E | 2.45 | 2.45 | 2.45 | 2.45 | 2.45 |
| HCFO-1233zd-E | | | | | |
| 3-Perfluoroheptene | | 0.50 | 1.50 | | |
| NFP | | | | 0.50 | 1.50 |
| Total B-side | 138.11 | 138.61 | 139.61 | 138.11 | 138.11 |
| Isocyanate PAPI 27 | 198.79 | 198.79 | 198.79 | 198.79 | 198.79 |
| Total A + B | 336.90 | 337.40 | 338.40 | 336.90 | 336.90 |
| 75° F./24° C. | 0.1381 | 0.1425 | 0.1383 | 0.1373 | 0.1374 |
| 50° F./10° C. | 0.1363 | 0.1418 | 0.1346 | 0.1334 | 0.1387 |
| 20° F./−6.7° C. | 0.1345 | 0.1384 | 0.1331 | 0.1322 | 0.1498 |

TABLE 6

| Component B-side | pphp polyol | | | | |
| --- | --- | --- | --- | --- | --- |
| | F5T3 | PFH05 | PFH15 | NFP-05 | NFP-15 |
| Stepanpol PS2352 | 100.00 | 100.00 | 100.00 | 100.00 | 100.00 |
| Dabco DC5585 | 2.25 | 2.25 | 2.25 | 2.25 | 2.25 |
| Polycat 36 | 0.40 | 0.40 | 0.40 | 0.40 | 0.40 |
| Dabco TMR-20 | 2.75 | 2.75 | 2.75 | 2.75 | 2.75 |
| TCPP | 10.00 | 10.00 | 10.00 | 10.00 | 10.00 |
| Water | 0.40 | 0.40 | 0.40 | 0.40 | 0.40 |
| Cyclopentane | 19.85 | 19.85 | 19.85 | 19.85 | 19.85 |
| HFO-1336mzz-E | | | | | |

TABLE 6-continued

| Component B-side | pphp polyol | | | | |
|---|---|---|---|---|---|
| | F5T3 | PFH05 | PFH15 | NFP-05 | NFP-15 |
| HCFO-1233zd-E | 1.94 | 1.94 | 1.94 | 1.94 | 1.94 |
| 3-Perfluoroheptene | | 0.50 | 1.50 | | |
| NFP | | | | 0.50 | 1.50 |
| Total B-side | 135.65 | 135.65 | 135.65 | 135.65 | 135.65 |
| Isocyanate PAPI 27 | 198.79 | 198.79 | 198.79 | 198.79 | 198.79 |
| Total A + B | 334.44 | 334.44 | 334.44 | 334.44 | 334.44 |
| k-Factor (Btu · in/ft2 · h · °F. Units) | | | | | |
| 75° F./24° C. | 0.1449 | 0.1364 | 0.1401 | 0.1352 | 0.1403 |
| 50° F./10° C. | 0.1430 | 0.1315 | 0.1354 | 0.1304 | 0.1358 |
| 20° F./−6.7° C. | 0.1404 | 0.1289 | 0.1345 | 0.1269 | 0.1324 |

As shown in the above Tables, in cyclopentane the NFP was effective in lowering k-factor relative to pure cyclopentane control, more so than PFH under these conditions. As shown in Tables 7-8, small amounts of HFO-1336mzzE and/or HCFO-1233zd(E) can afford a significant improvement to k-factors when blended with cyclopentane in the presence of nucleating agents. For example, Table 4 shows that when PFH was used as a nucleating agent, improvements were observed at higher levels of the PFH. However, when NFP was used, improvements were observed at lower concentration of the nucleating agent, with decreased performance at higher concentration. In the absence of nucleating agents, HFO-1336mzz(E) exhibited improved thermal performance over HCFO-1233zd(E) at low loadings. However, HCFO-1233zd(E) responded more favorably in the presence of nucleating agents PFH and NFP at lower concentrations, with decreased performance at higher levels. These data show that all of the fluorocarbon nucleating agents provided improvements in k-factors at all temperatures measured without altering the process parameters significantly.

Example 4. Comparative Analysis of Fluorocarbon Nucleating Agents

In this series, pure cyclopentane blown foam was compared with several fluorocarbons as nucleating agents at a very low loading (e.g., 0.5%; typical concentration of fluorocarbon for use as a blowing agent is 10-20%). In this manner, the impact of the fluorocarbon as a nucleating agent was assessed versus the typical improvements expected by substituting a better insulating molecule with another. The data disclosed in Tables 7-8 show that all of the fluorocarbon nucleating agents provided improvements in k-factors at all temperatures measured without altering the process parameters significantly.

TABLE 7

| | Loading (%) | | | | | | | |
|---|---|---|---|---|---|---|---|---|
| HFO 1336mzz-Z | — | 0.50 | — | — | — | — | — | — |
| HFO 1336mzz-E | — | — | 0.50 | — | — | — | — | — |
| HCFO 1233zd-E | — | — | — | 0.50 | — | — | — | — |
| Cyclopentane | 14.65 | 14.43 | 14.43 | 14.37 | 14.38 | 14.41 | 14.54 | 14.51 |
| HFC 245fa | — | — | — | — | 0.50 | — | — | — |
| HFC 365mfc | — | — | — | — | — | 0.44 | — | — |
| HFC 227ea | — | — | — | — | — | 0.07 | — | — |
| FC 161-14mcyy | — | — | — | — | — | — | 0.50 | — |
| HFO 153-10mzzy | — | — | — | — | — | — | — | 0.50 |
| Total B-side w/ Blowing Agent | 122.66 | 122.94 | 122.94 | 122.88 | 122.89 | 122.93 | 123.05 | 123.02 |
| IsoCyanate PAPI 27 (A-side) | 143.08 | 143.08 | 143.08 | 143.08 | 143.08 | 143.08 | 143.08 | 143.08 |
| Total A + B | 265.74 | 266.02 | 266.02 | 265.96 | 265.97 | 266.01 | 266.13 | 266.10 |

Water = 1.46 pbw
Total B-Side without Blowing Agent: 108.01 pbw

TABLE 8

| Results | Control 100% CP | CP + HFO-1336mzz-Z | CP + HFO-1336mzz-E | CP + HCFO-1233zd | CP + HFC-245fa | CP + HFC-365mfc & 227ea | CP + FC-161-14mcyy | CP + HFO-153-10mzzy |
|---|---|---|---|---|---|---|---|---|
| Cream (s) | 7 | 6 | 4 | 6 | 7 | 5 | 6 | 5 |
| Gel (s) | 44 | 44 | 39 | 43 | 46 | 42 | 42 | 44 |
| Rise (s) | 84 | 79 | 72 | 78 | 80 | 79 | 72 | 82 |
| Tack-free (s) | 85 | 80 | 74 | 79 | 81 | 80 | 76 | 83 |

TABLE 8-continued

| Results | Control 100% CP | CP + HFO-1336mzz-Z | CP + HFO-1336mzz-E | CP + HCFO-1233zd | CP + HFC-245fa | CP + HFC-365mfc & 227ea | CP + FC-161-14mcyy | CP + HFO-153-10mzzy |
|---|---|---|---|---|---|---|---|---|
| K-factor 75° F. (Btu in/ft^2 hr ° F.) | 0.1455 | 0.1402 | 0.1401 | 0.1400 | 0.1415 | 0.1406 | 0.1375 | 0.1383 |
| K-factor 50° F. (Btu in/ft^2 hr ° F.) | 0.1354 | 0.1312 | 0.1311 | 0.1312 | 0.1325 | 0.1317 | 0.1288 | 0.1302 |
| K-factor 35° F. (Btu in/ft^2 hr ° F.) | 0.1316 | 0.1274 | 0.1273 | 0.1281 | 0.1286 | 0.1283 | 0.1257 | 0.1272 |

Other Embodiments

1. In some embodiments, the present application provides a process of forming a foam, comprising reacting a foamable composition comprising a blowing agent and one or more nucleating agents, under conditions effective to form a foam, wherein the nucleating agent is selected from:
HFO-162-13mczy;
HFO-162-13mcyz;
(E)-1,1,1,2,2,3,5,5,6,6,7,7,7-tridecafluoro-4-methoxyhept-3-ene;
(E)-1,1,1,2,2,4,5,5,6,6,7,7,7-tridecafluoro-3-methoxyhept-3-ene;
1,1,1,2,2,3,4,5,6,6,7,7,7-tridecafluoro-5-methoxyhept-3-ene;
(Z)-1,1,1,2,2,3,4,5,6,6,7,7,7-tridecafluoro-5-methoxyhept-3-ene;
(E)-1,1,1,2,2,3,4,5,6,6,7,7,7-tridecafluoro-5-methoxyhept-3-ene;
1,1,1,2,3,4,5,5,6,6,7,7,7-tridecafluoro-4-methoxyhept-2-ene;
(Z)-1,1,1,2,3,4,5,5,6,6,7,7,7-tridecafluoro-4-methoxyhept-2-ene;
(E)-1,1,1,2,3,4,5,5,6,6,7,7,7-tridecafluoro-4-methoxyhept-2-ene;
(Z)-1,1,1,2,2,4,5,5,6,6,7,7,7-tridecafluoro-3-methoxyhept-3-ene;
(Z)-1,1,1,2,2,3,5,5,6,6,7,7,7-tridecafluoro-4-methoxyhept-3-ene;
HFC-4310mee;
HFO-153-10mzzy;
HFO-153-10mczz
FC-161-14mcyy;
3,3,4,4,5,5,6,6,6-nonafluorohex-1-ene;
3,3,4,4,5,5,6,6,7,7,8,8,8-tridecafluoro-1-octanol and
3,3,4,4,5,5,6,6,7,7,8,8,8-tridecafluorooct-1-ene;
or any mixture thereof.

2. The process of embodiment 1, wherein the foamable composition comprises about 1 to about 5 parts by weight of the one or more nucleating agents.

3. The process of embodiment 1 or 2, wherein the foam has a K-factor of about 0.135 Btu·in/ft²·h·° F. or less at about 20° F.

4. The process of embodiment 1 or 2, wherein the foam has a K-factor of from about 0.131 Btu·in/ft²·h·° F. to about 0.134 at about 20° F.

5. The process of any one of embodiments 1 to 4, wherein the foam has a K-factor of about 0.147 Btu·in/ft²·h·° F. or less at about 70° F.

6. The process of any one of embodiments 1 to 4, wherein the foam has a K-factor of from about 0.140 Btu·in/ft²·h·° F. to 0.146 about at about 70° F.

7. The process of any one of embodiments 1 to 6, wherein the blowing agent comprises cyclopentane, n-pentane, iso-pentane, HFO-1336mzz-E, HFO-1336mzz-Z, HCFC-1233zd, HCFO-1224yd, HFO-1234ze, CFO-1112, HFC-245fa, and HFC-365mfc, or any mixture thereof.

8. The process of any one of embodiments 1 to 6, wherein the blowing agent comprises cyclopentane.

9. The process of embodiment 8, wherein the foamable composition comprises about 10 to about 15 weight percent cyclopentane.

10. The process of embodiment 8, wherein the foamable composition comprises about 14 to about 15 weight percent cyclopentane.

11. The process of any one of embodiments 1 to 6, wherein the blowing agent comprises:
(a) cyclopentane; and
(b) a second component selected from HFO-1336mzz-Z, HFO-1336mzz-E, and HCFC-1233zd.

12. The process of any one of embodiments 1 to 6 and 11, wherein the foamable composition comprises about 0.5 to about 3 weight percent nucleating agent.

13. The process of any one of embodiments 1 to 6, 11, and 12, wherein the blowing agent comprises cyclopentane and HFO-1336mzz-Z.

14. The process of any one of embodiments 1 to 6 and 11 to 13, wherein the blowing agent comprises about 40 to about 80 weight percent cyclopentane and about 60 to about 20 weight percent HFO-1336mzz-Z.

15. The process of any one of embodiments 1 to 6 and 11 to 13, wherein the blowing agent comprises about 25 to about 35 weight percent cyclopentane and about 65 to about 75 weight percent HFO-1336mzz-Z.

16. The process of any one of embodiments 1 to 6 and 11 to 13, wherein the blowing agent comprises about 30 weight percent cyclopentane and about 70 weight percent HFO-1336mzz-Z.

17. The process of any one of embodiments 1 to 6, 11, and 12, wherein the blowing agent comprises cyclopentane and HFO-1336mzz-E.

18. The process of any one of embodiments 1 to 6, 11, 12, and 17, wherein the blowing agent comprises about 90 to about 50 weight percent cyclopentane and about 10 to about 50 weight percent HFO-1336mzz-E.

19. The process of any one of embodiments 1 to 6, 11, 12, and 17, wherein the blowing agent comprises about 90 to about 99 weight percent cyclopentane and about 1 to about 10 weight percent HFO-1336mzz-E.

20. The process of any one of embodiments 1 to 6, 11, 12, and 17, wherein the blowing agent comprises about 95 weight percent cyclopentane and about 5 weight percent HFO-1336mzz-E.

21. The process of any one of embodiments 1 to 6, 11, and 12, wherein the blowing agent comprises cyclopentane and HCFC-1233zd.

22. The process of any one of embodiments 1 to 6, 11, 12, and 21, wherein the blowing agent comprises about 70 to about 30 weight percent cyclopentane and about 30 to about 70 weight percent HCFC-1233zd.

23. The process of any one of embodiments 1 to 6, 11, 12, and 21, wherein the blowing agent comprises about 90 to about 99 weight percent cyclopentane and about 1 to about 10 weight percent HCFC-1233zd.

24. The process of any one of embodiments 1 to 6, 11, 12, and 21, wherein the blowing agent comprises about 95 weight percent cyclopentane and about 5 weight percent HCFC-1233zd.

25. The process of any one of embodiments 1 to 24, wherein the foamable composition further comprises one or more additional components selected from at least one polyol, at least one catalyst, at least one surfactant, water, and at least one flame retardant agent.

26. The process of any one of embodiments 1 to 25, wherein the foamable composition further comprises at least one polyol.

27. The process of any one of embodiments 1 to 26, wherein the foamable composition comprises two polyols.

28. The process of any one of embodiments 25 to 27, wherein each polyol is a polyester polyol.

29. The process of any one of embodiments 25 to 28, wherein foamable composition comprises Terol 250 and Voranol 360.

30. The process of any one of embodiments 1 to 29, wherein the foamable composition further comprises at least one catalyst.

31. The process of embodiment 25 or 30, wherein the foamable composition comprises an amine catalyst, a trimerization catalyst, and a blow catalyst.

32. The process of embodiment 31, wherein the amine catalyst is Polycat 8.

33. The process of embodiment 31, wherein the trimerization catalyst is Dabco K-15.

34. The process of embodiment 31, wherein the blow catalyst is Polycat 5.

35. The process of any one of embodiments 1 to 34, wherein the foamable composition further comprises at least one surfactant.

36. The process of embodiment 25 or 35, wherein the surfactant is a silicone surfactant.

37. The process of embodiment 25 or 35, wherein the surfactant is Tegostab B 84501.

38. The process of any one of embodiments 1 to 37, wherein the foamable composition further comprises water.

39. The process of any one of embodiments 1 to 38, wherein the foamable composition further comprises at least one flame retardant agent.

40. The process of embodiments 25 or 39, wherein the flame retardant agent is tris(chloropropyl)phosphate.

41. The process of any one of embodiments 1 to 40, wherein the foam is a polyurethane foam or a polyisocyanurate foam.

42. The process of any one of embodiments 1 to 41, wherein the foam is a closed cell foam.

43. The process of any one of embodiments 1 to 42, wherein the foam exhibits improved compressive strength compared to a foam prepared by reacting the foamable composition in the absence of the nucleating agent.

44. The process of any one of embodiments 1 to 43, wherein the foam exhibits improved dimensional stability compared to a foam prepared by reacting the foamable composition in the absence of the nucleating agent.

45. A foam, which is prepared according to the process of any one of embodiments 1 to 44.

46. A closed cell polyisocyanurate foam prepared according to the process of any one of embodiments 1 to 44.

47. A closed cell polyurethane foam prepared according to the process or any one of embodiments 1 to 44.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A process of forming a foam, comprising reacting a foamable composition comprising a blowing agent and one or more nucleating agents, under conditions effective to form a foam, wherein the nucleating agent is selected from:
   (E)-1,1,1,2,2,3,5,5,6,6,7,7,7-tridecafluoro-4-methoxy-hept-3-ene;
   (E)-1,1,1,2,2,4,5,5,6,6,7,7,7-tridecafluoro-3-methoxy-hept-3-ene;
   1,1,1,2,2,3,4,5,6,6,7,7,7-tridecafluoro-5-methoxyhept-3-ene;
   (Z)-1,1,1,2,2,3,4,5,6,6,7,7,7-tridecafluoro-5-methoxy-hept-3-ene;
   (E)-1,1,1,2,2,3,4,5,6,6,7,7,7-tridecafluoro-5-methoxy-hept-3-ene;
   1,1,1,2,3,4,5,5,6,6,7,7,7-tridecafluoro-4-methoxyhept-2-ene;
   (Z)-1,1,1,2,3,4,5,5,6,6,7,7,7-tridecafluoro-4-methoxy-hept-2-ene;
   (E)-1,1,1,2,3,4,5,5,6,6,7,7,7-tridecafluoro-4-methoxy-hept-2-ene;
   (Z)-1,1,1,2,2,4,5,5,6,6,7,7,7-tridecafluoro-3-methoxy-hept-3-ene;
   (Z)-1,1,1,2,2,3,5,5,6,6,7,7,7-tridecafluoro-4-methoxy-hept-3-ene;
   3,3,4,4,5,5,6,6,7,7,8,8,8-tridecafluoro-1-octanol and 3,3,4,4,5,5,6,6,7,7,8,8,8-tridecafluorooct-1-ene;
   or any mixture thereof; and wherein the blowing agent comprises:
   (a) cyclopentane; and
   (b) a second component selected from HFO-1336mzz-Z, HFO-1336mzz-E, and HCFC-1233zd.

2. The process of claim 1, wherein the foamable composition further comprises at least one polyol, and wherein the foamable composition comprises about 1 to about 5 parts by weight of the one or more nucleating agents per 100 parts by weight of the at least one polyol.

3. The process of claim 1, wherein the foam has a K-factor of about 0.135 Btu·in/ft$^2$·h·° F. or less at about 20° F.

4. The process of claim 1, wherein the foam has a K-factor of from about 0.131 Btu·in/ft$^2$·h·° F. to about 0.134 at about 20° F.

5. The process of claim 1, wherein the foam has a K-factor of about 0.147 Btu·in/ft$^2$·h·° F. or less at about 70° F.

6. The process of claim 1, wherein the foam has a K-factor of from about 0.140 Btu·in/ft$^2$·h·° F. to 0.146 about at about 70° F.

7. The process of claim 1, wherein the foamable composition comprises about 10 to about 15 weight percent cyclopentane.

8. The process of claim 1, wherein the foamable composition comprises about 0.5 to about 3 weight percent nucleating agent.

9. The process of claim 8, wherein the blowing agent comprises cyclopentane and HFO-1336mzz-Z.

10. The process of claim 9, wherein the blowing agent comprises about 40 to about 80 weight percent cyclopentane and about 60 to about 20 weight percent HFO-1336mzz-Z.

11. The process of claim 9, wherein the blowing agent comprises about 25 to about 35 weight percent cyclopentane and about 65 to about 75 weight percent HFO-1336mzz-Z.

12. The process of claim 9, wherein the blowing agent comprises about 30 weight percent cyclopentane and about 70 weight percent HFO-1336mzz-Z.

13. The process of claim 8, wherein the blowing agent comprises cyclopentane and HFO-1336mzz-E.

14. The process of claim 13, wherein the blowing agent comprises about 90 to about 50 weight percent cyclopentane and about 10 to about 50 weight percent HFO-1336mzz-E.

15. The process of claim 13, wherein the blowing agent comprises about 90 to about 99 weight percent cyclopentane and about 1 to about 10 weight percent HFO-1336mzz-E.

16. The process of claim 8, wherein the blowing agent comprises cyclopentane and HCFC-1233zd.

17. The process of claim 16, wherein the blowing agent comprises about 70 to about 30 weight percent cyclopentane and about 30 to about 70 weight percent HCFC-1233zd.

18. The process of claim 16, wherein the blowing agent comprises about 95 weight percent cyclopentane and about 5 weight percent HCFC-1233zd.

19. The process of claim 1, wherein the foamable composition further comprises one or more additional components selected from at least one polyol, at least one catalyst, at least one surfactant, water, and at least one flame retardant agent.

20. The process of claim 1, wherein the foamable composition further comprises at least one catalyst.

21. The process of claim 20, wherein the foamable composition comprises an amine catalyst, a trimerization catalyst, and a blow catalyst.

22. The process of claim 1, wherein the foamable composition further comprises water.

23. The process of claim 1, wherein the foamable composition further comprises at least one flame retardant agent.

24. The process of claim 1, wherein the foam is a polyurethane foam or a polyisocyanurate foam.

25. The process of claim 1, wherein the foam is a closed cell foam.

* * * * *